(12) United States Patent  (10) Patent No.: US 8,529,093 B2
Fuentes  (45) Date of Patent: Sep. 10, 2013

(54) SAFETY DEVICE FOR MOTORIZED VEHICLES AND METHODS OF USE THEREOF

(76) Inventor: Oscar Fuentes, Ontario (CA)

( * ) Notice: Subject to any disclaimer, the term of this patent is extended or adjusted under 35 U.S.C. 154(b) by 464 days.

(21) Appl. No.: 12/824,401

(22) Filed: Jun. 28, 2010

(65) Prior Publication Data

US 2011/0316421 A1    Dec. 29, 2011

(51) Int. Cl.
*F21S 4/00*  (2006.01)
*F21V 21/00*  (2006.01)

(52) U.S. Cl.
USPC ............. 362/249.05; 362/473; 362/249.02; 362/545

(58) Field of Classification Search
USPC ............. 362/473, 474, 540, 545, 249.02, 362/249.05
See application file for complete search history.

(56) References Cited

U.S. PATENT DOCUMENTS

| 5,132,666 | A | * | 7/1992 | Fahs | 340/468 |
| 5,984,487 | A | * | 11/1999 | McGhee | 362/507 |
| 7,178,955 | B2 | * | 2/2007 | Hayes | 362/475 |
| 8,070,308 | B1 | * | 12/2011 | Lo et al. | 362/106 |
| 2009/0080207 | A1 | * | 3/2009 | Hurwitz | 362/464 |

* cited by examiner

*Primary Examiner* — Stephen F Husar
*Assistant Examiner* — James Cranson, Jr.
(74) *Attorney, Agent, or Firm* — Heidi L. Eisenhut; Loza & Loza LLP

(57) ABSTRACT

Embodiments of a safety device for motorized vehicles and methods of use thereof are herein disclosed. In one embodiment, the safety device includes a mountable lighting device in electrical communication with a momentary switch. The lighting device may include a plurality of non-coherent light sources which may flash in a particular sequence. In one embodiment, the lighting device may be activated to flash once to signal to a motorist that a motorcyclist is to pass. The lighting device may be activated to flash twice to signal to a motorist that the motorcyclist is approaching. The lighting device may be activated to flash three times to signal to a motorist that the motorcyclist is passing.

9 Claims, 9 Drawing Sheets

US 8,529,093 B2

SAFETY DEVICE FOR MOTORIZED VEHICLES AND METHODS OF USE THEREOF

FIELD OF INVENTION

Safety devices for motorized vehicles.

BACKGROUND OF INVENTION

Over half of all fatal motorcycle crashes involve another vehicle. Contrary to conventional wisdom, the motorist and not the motorcyclist is at fault in the majority of incidents. Because of its small size, a motorcycle can be easily hidden in a car's blind spots (door/roof pillars) or masked by objects or backgrounds outside a car (bushes, fences, bridges, etc). Additionally, a motorcycle may look farther away than it is. Consequently, it may also be difficult for a motorist to judge a motorcycle's speed.

A common accident between a motorist and a motorcyclist occurs when the motorcyclist passes another vehicle (i.e., a car or truck). The technique for passing another vehicle is the same whether riding a motorcycle or driving a car. Before passing, the motorcyclist should be two (or more) seconds behind the vehicle it wants to pass and should typically be positioned in the left-hand side of the lane. From this position, the motorcyclist should check oncoming traffic and the road to make sure there is enough distance to pass safely. If there is room ahead to make the pass, the motorcyclist should look in the mirrors, turn the signal on, and always look over the shoulder. If everything is clear, the motorcyclist should move into the left lane and pass the car or truck. The motorcyclist should not crowd too close to the vehicle it is passing, but rather should be more or less in the center of the passing lane. Before returning to the original lane, the motorcyclist should signal an intention to return to the original lane in addition to doing a head check to make sure that there is enough room between the bike and the vehicle just passed.

While such cautionary measures are often followed, accidents do still occur. In some cases, the motorcyclist is in the motorist's blind spot or some other obstruction prevents the driver from adequately seeing the bike. In other cases, a turn signal is not used or, if used, the driver simply does not see the signal. For example, because of the position of turn signals on motorcycles, the signal may be in the motorist's blind spot.

Consequently, a device and/or method to assist motorcyclists in safely passing vehicles is/are desired.

SUMMARY OF INVENTION

A safety device for alerting a vehicle, comprising: a lighting device capable of sending discrete flashing signals; and a biased switch in electrical communication with the lighting device is herein disclosed. The lighting device may comprise: a housing having a top component and a bottom component configured to define a front aperture when assembled together; at least one opaque component within the front aperture of the housing; a plurality of light-emitting diodes within the housing and projected toward the at least one opaque component; a panel having a plurality of openings to receive the plurality of light-emitting diodes; at least one printed circuit within the housing; and at least one power source within the housing.

The lighting device may further comprise: at least one port for receiving a Universal Serial Bus connector; and at least one circuit board within the housing. In one embodiment, the plurality of light-emitting diodes is in a linear array. The safety device may further comprise a connector in electrical communication with the at least one port. In one embodiment, the biased switch is a momentary push-button switch.

A method for a motorcyclist to safely pass a vehicle, comprising: activating a switch to cause a lighting device to flash one time, the single flash signaling a warning to a motorist that a motorcyclist is to pass; activating the switch to cause the lighting device to flash two times, the double flash signaling a warning to the motorist that the motorcyclist is approaching the motorist; and activating the switch to cause the lighting device to flash three times, the triple flash signaling a warning to the motorist that the motorcyclist is passing the motorist is herein disclosed. In one embodiment, activating the switch comprises applying pressure to a momentary push-button biased switch located on a motorcycle handlebar.

DETAILED DESCRIPTION

The following detailed description is of the best currently contemplated modes of carrying out the invention. The description is not to be taken in a limiting sense, but is made merely for the purpose of illustrating the general principles of the invention.

Embodiments of a safety device for motorized vehicles and methods of use thereof are herein disclosed. In one embodiment, the safety device includes a mountable lighting device in electrical communication with a momentary switch. The lighting device may include a plurality of non-coherent light sources which may flash in a particular sequence. In one embodiment, the lighting device may be activated to flash once to signal to a motorist that a motorcyclist is to pass. The lighting device may be activated to flash twice to signal to a motorist that the motorcyclist is approaching. The lighting device may be activated to flash three times to signal to a motorist that the motorcyclist is passing. Activation may be purposefully directed or automated.

Figure 1:
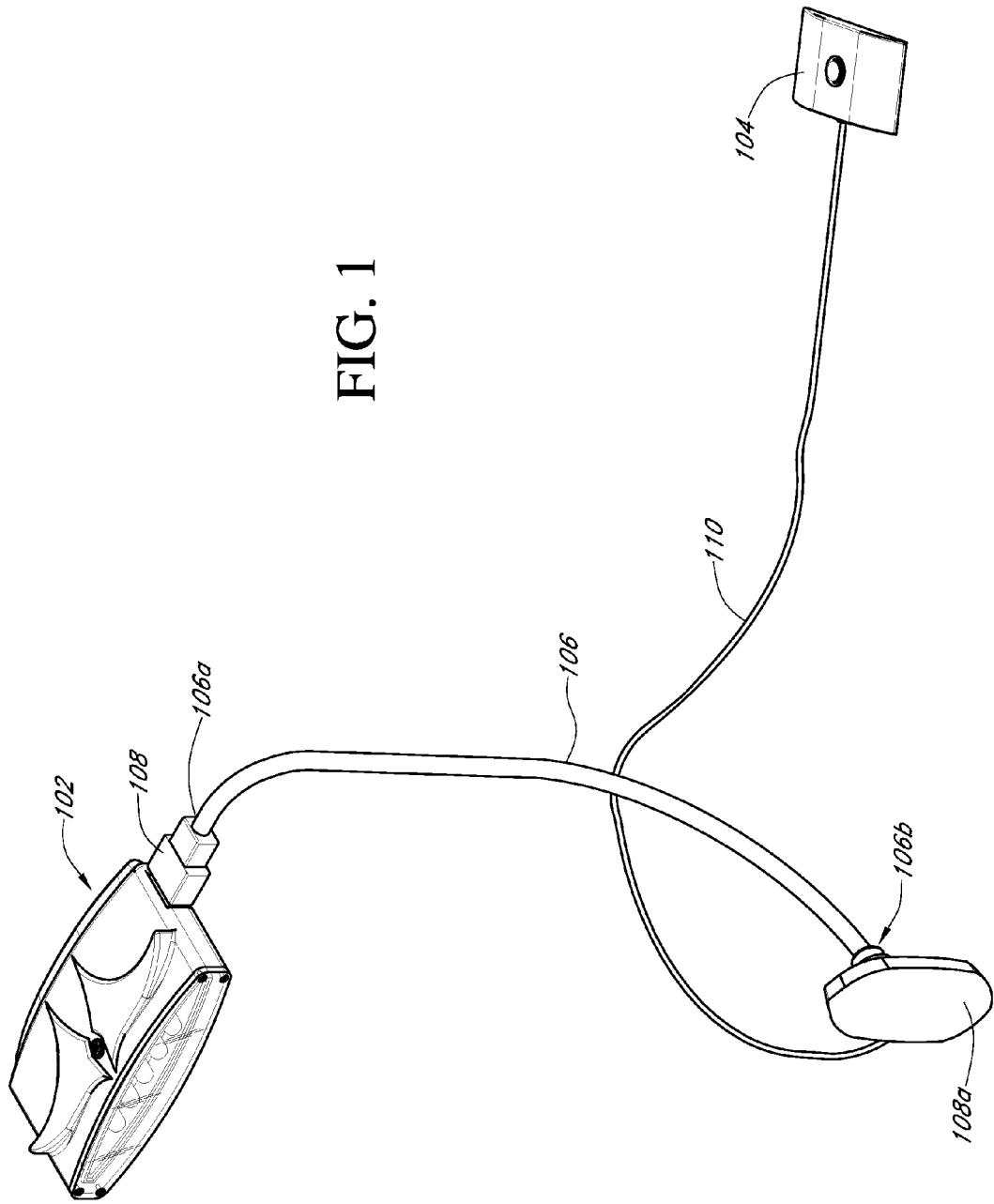
FIG. 1 illustrates a perspective view of a safety device for motorized vehicles according to an embodiment of the invention.

FIG. 1 illustrates a perspective view of a safety device for motorized vehicles according to an embodiment of the invention. The safety device 100 may include a lighting device 102 in electrical communication with a biased switch 104. In one embodiment, the biased switch 104 is a momentary push button switch. A flexible member 106 having a proximal end 106a and a distal end 106b may be intermediate between the lighting device 102 and the biased switch 104. In one embodiment, the proximal end 106a terminates into a connector 108 such as a Universal Bus Connector (USB) adapted to removeably connect into a port (not shown, see FIG. 2) of the lighting device 102; however, other suitable connectors are within the scope of the invention. In one embodiment, the distal end 106b terminates in intermediary component 108a and may be adapted to receive an electrical connection wire 110 attached to the biased switch 104.

Figure 2:
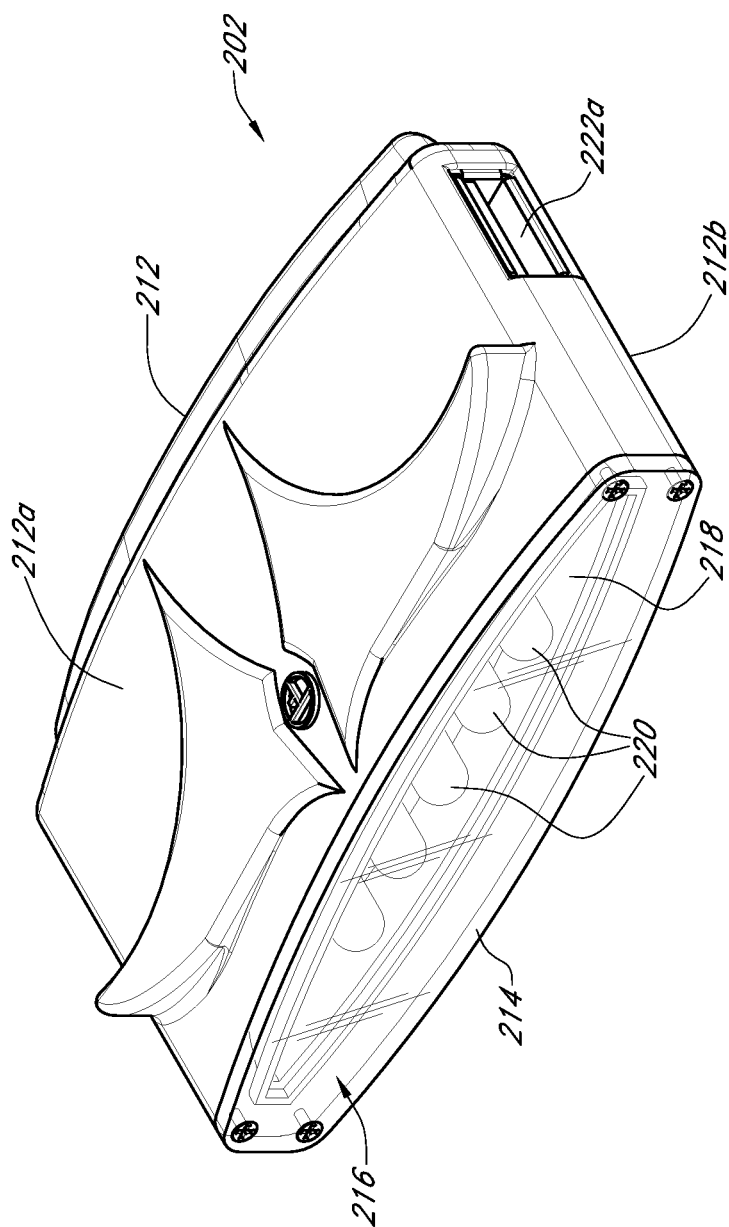
FIG. 2 illustrates a perspective view of a lighting device according to an embodiment of the invention.

FIG. 2 illustrates a perspective view of a lighting device according to an embodiment of the invention. In this view, the lighting device 202 is shown in an assembled configuration. The lighting device 202 includes (among other components, explained in more detail below) a housing 212 which includes a top component 212a and a bottom component 212b configured to define a front aperture 214 when assembled together as shown. The housing 212 may be made of an acrylic material or any other suitable equivalent thereof and may be about eight and one-half (8.5) centimeters in length, about four and four-fifths (4.8) centimeters in width and about two and one-tenth (2.1) centimeters in height.

Figure 3:
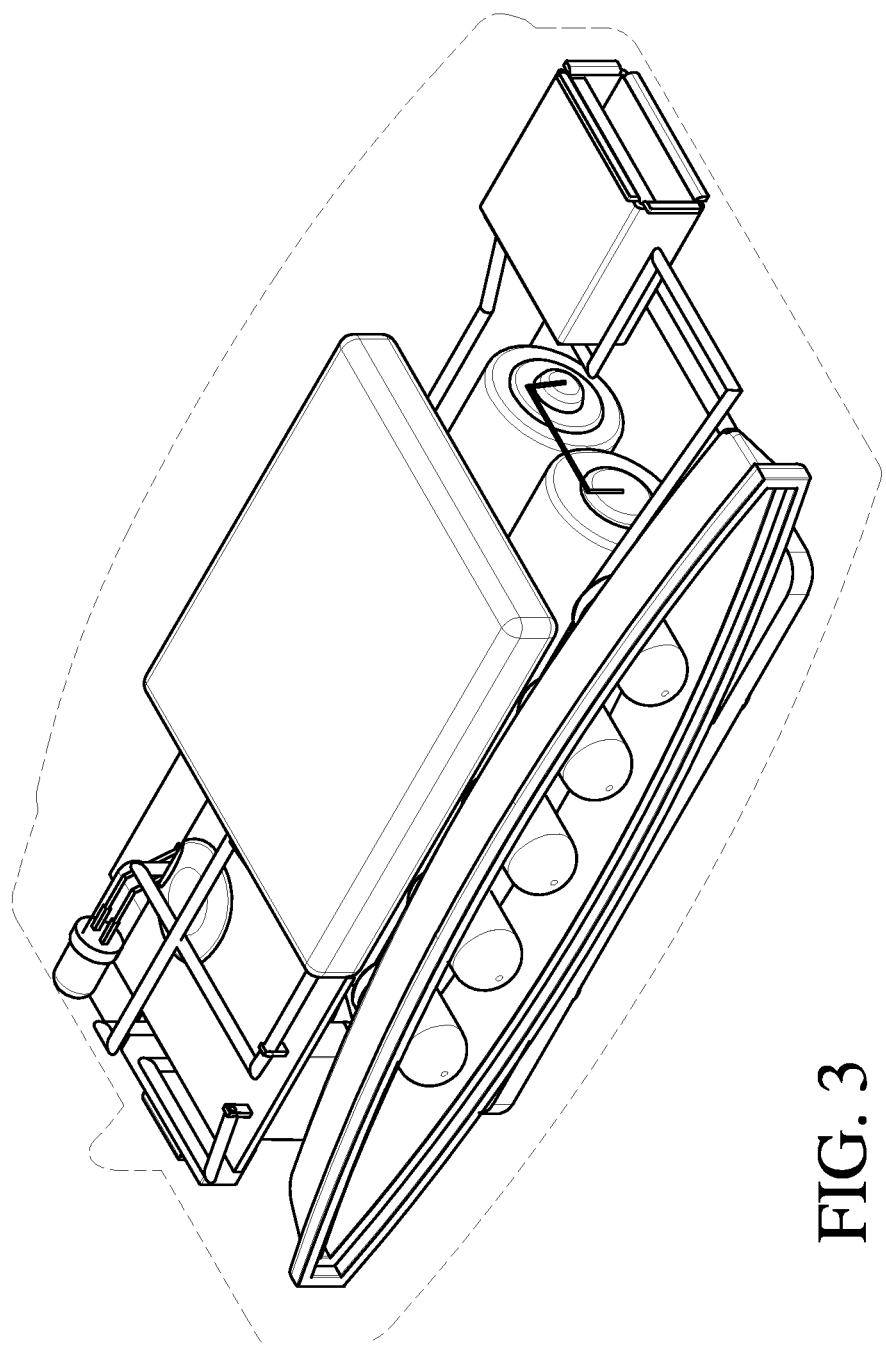
FIG. 3 is a transparent perspective view of a lighting device of FIG. 2.

An opaque component 216 may cover the front aperture 214. The opaque component 216 may be, for example, clear acrylic or any other suitable equivalent thereof. The opaque component 216 may be connected to the assembled housing 212 by a plurality of screws 216 or any other suitable equivalent thereof. Situated behind opaque component 216 and within housing 212 may be a panel 218 (explained in more detail below) with a plurality of openings (not shown) to receive a plurality of light-emitting diodes (LEDs) 220 (explained in more detail below). Also shown in this view is a first port 222a for receiving a Universal Serial Bus (USB) connector. Although first port 222a is shown on a side of housing 212, it should be appreciated that first port 222a may be located on any suitable portion of housing 212. FIG. 3 is a transparent perspective view of a lighting device of FIG. 2 showing inner components therein.

Figure 4:
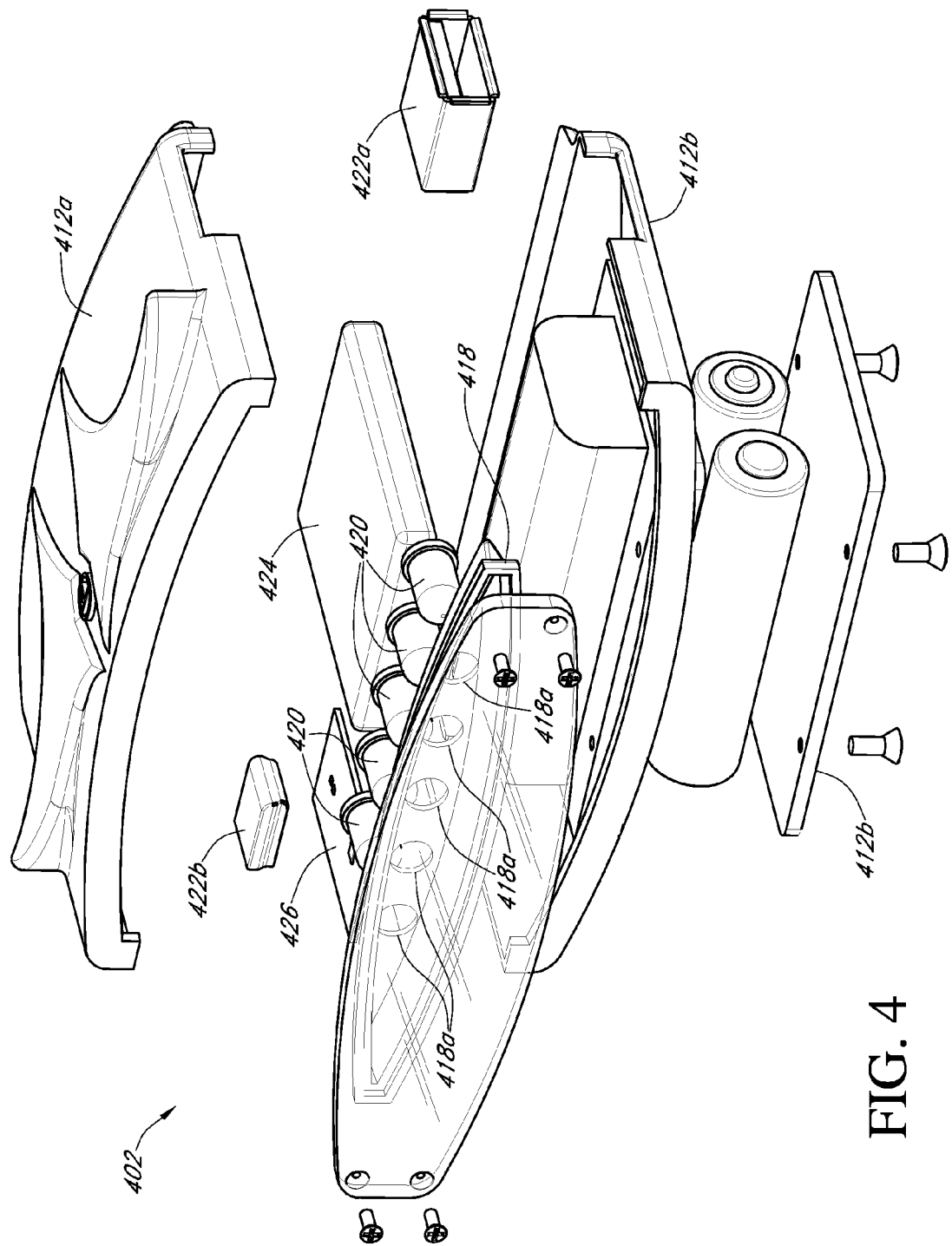
FIG. 4 illustrates an exploded perspective view of the lighting device of FIG. 2.

FIG. 4 illustrates an exploded perspective view of the lighting device of FIG. 2. In this view, the lighting device 402 is shown in a disassembled configuration. The housing 412 comprising top component 412a and bottom component 412b houses internal components including, but not limited to, panel 418, LEDs 420, a first port 422a, a second port 422b, a plurality of power sources 424 and a printed circuit board (PCB) 426 and may be assembled as known by one of ordinary skill in the art (see FIG. 3). In one embodiment, the power sources 424 are rechargeable or disposable batteries as known by one of ordinary skill in the art. The power sources 424 are in electrical communication with the PCB 426 as known by one of ordinary skill in the art. In one embodiment, panel 418 is an LED reflector having a plurality of openings 418a situated in a linear array. In alternative embodiments, openings 418a may be situated in a circular array or any other suitable configuration. The plurality of openings 418a may be adapted to receive the plurality of LEDs 420. The openings 418a may number from two (2) to ten (10), in one embodiment, the openings 418a number five (5) and are situated in a linear array.

Figure 5:
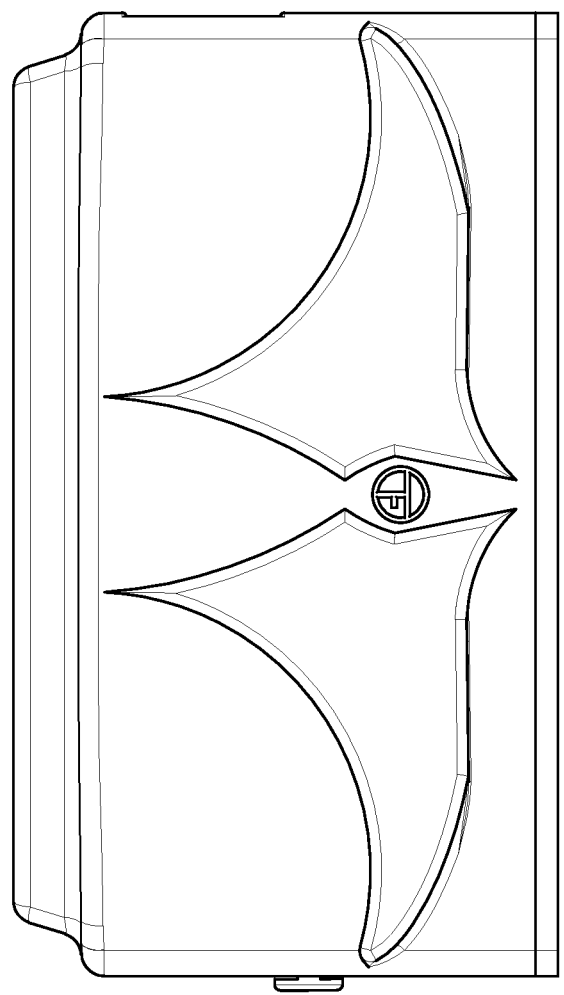
FIG. 5 illustrates a top view of the lighting device of FIG. 2.
Figure 6:
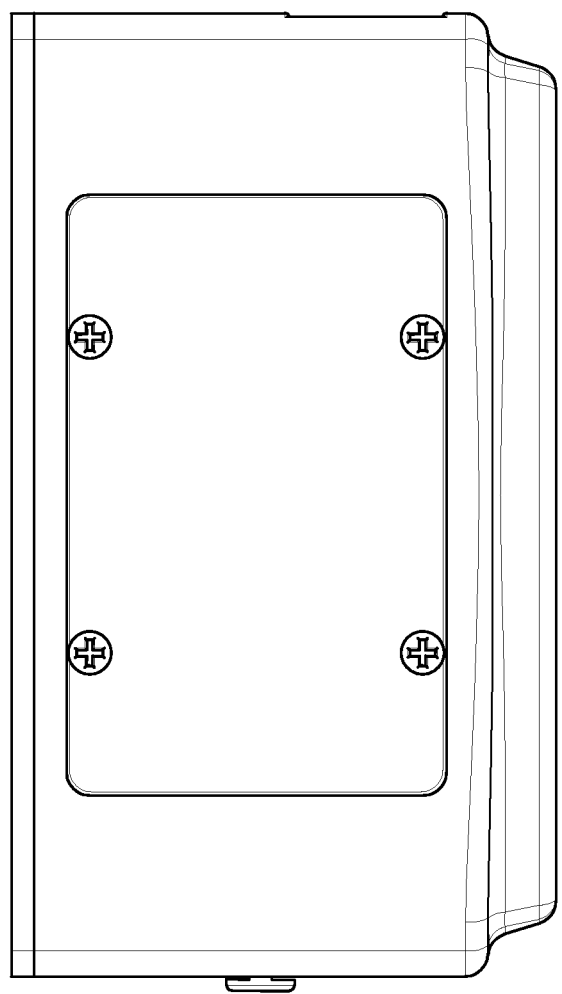
FIG. 6 illustrates a bottom view of the lighting device of FIG. 2.
Figure 7:
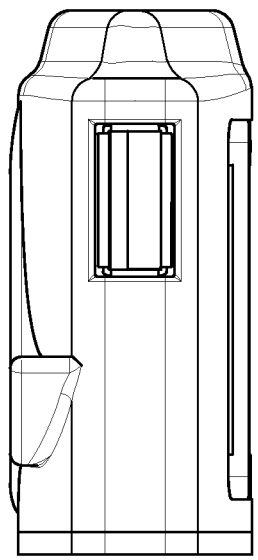
FIG. 7 illustrates a left side view of the lighting device of FIG. 2.
Figure 8:
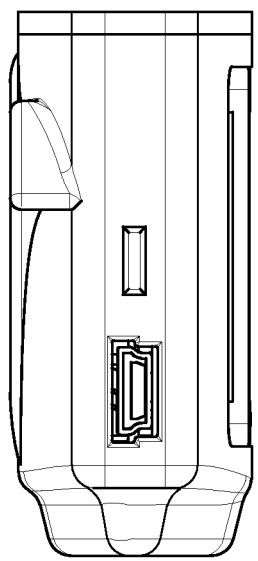
FIG. 8 illustrates a right side view of the lighting device of FIG. 2.
Figure 9:
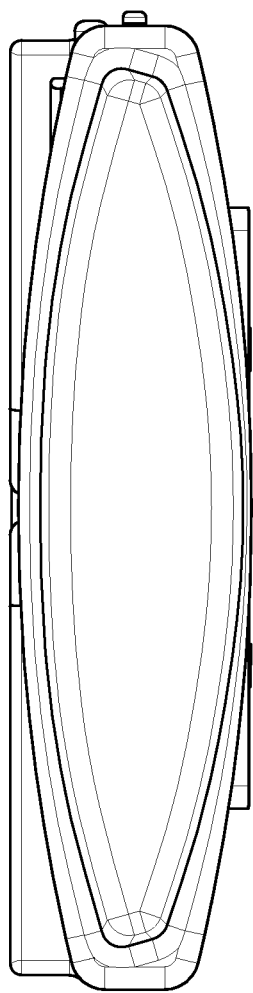
FIG. 9 illustrates a back view of the lighting device of FIG. 2.
Figure 10:
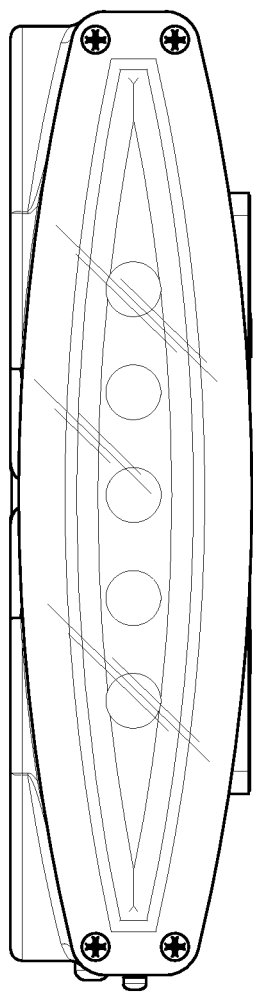
FIG. 10 illustrates a front view of the lighting device of FIG. 2.
Figure 11:
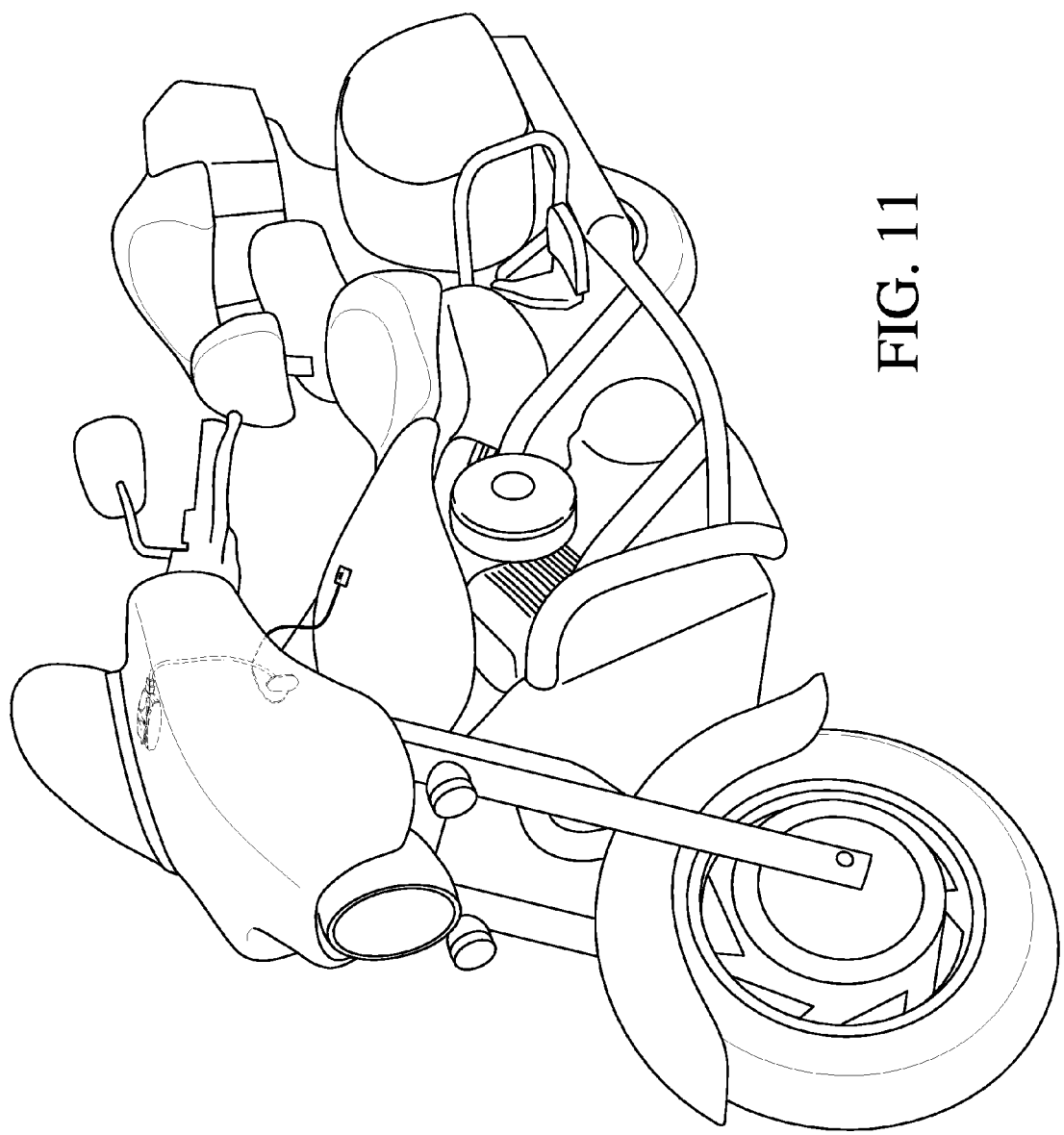
FIG. 11 illustrates the safety device of FIG. 1 mounted on a motorcycle.

FIG. 5 illustrates a top view of the lighting device of FIG. 2. FIG. 6 illustrates a bottom view of the lighting device of FIG. 2. FIG. 7 illustrates a left side view of the lighting device of FIG. 2. FIG. 8 illustrates a right side view of the lighting device of FIG. 2. FIG. 9 illustrates a back view of the lighting device of FIG. 2. FIG. 10 illustrates a front view of the lighting device of FIG. 2. FIG. 11 illustrates the safety device of FIG. 1 mounted on a motorcycle. According to this embodiment, the lighting device is mounted on the windshield of the motorcycle while the momentary biased switch is mounted on the left clutch handle near the light low/high beam switch.

According to one method, the safety device as previously shown and described may be used to warn a motorist that the motorcyclist will pass. For example, the motorcyclist may activate the biased switch to cause the lighting device to flash one time wherein the single flash signals a warning to a motorist that a motorcyclist is to pass. Then, the motorcyclist may activate the biased switch to cause the lighting device to flash two times wherein the double flash signals a warning to the motorist that the motorcyclist is approaching the motorist. Then, the motorcyclist may activate the switch to cause the lighting device to flash three times wherein the triple flash signals a warning to the motorist that the motorcyclist is passing the motorist. Activation may be purposefully directed or automated. In one embodiment, activating the switch comprises applying pressure to a momentary push-button biased switch located on a motorcycle handlebar. In this respect, using the safety device according to embodiments of the invention may allow a motorcyclist to pass a motorist in a safe manner.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:

1. A safety devise for alerting a vehicle, compromising:
    a mountable lighting device capable of sending discrete flashing signals, the lighting device compromising:
    a housing having a top component and a bottom component configured to define a front aperture when assembled together;
    at least one opaque component within the front aperture of the housing;
    a plurality of light-emitting diodes within the housing and projected toward the at least one opaque component;
    a panel having a plurality of openings to receive the plurality of light-emitting diodes;
    at least one printed circuit board within the housing and in electrical communication with the plurality of light-emitting diodes;
    at least one power source within the housing for providing power to the printed circuit board; and
    a biased switch in electrical communication with the lighting device wherein the biased switch is separate from the housing.

2. The safety device of claim 1 wherein the lighting device further compromises:
    at least one port, within the housing and connected to the printed circuit board, for receiving a Universal Serial Bus connector.

3. The safety device of claim 2, further compromising; a connector in electrical communication with the at least one port.

4. The safety device of claim 1 wherein the plurality of light-emitting diodes are in a linear array.

5. The safety device of claim 1 wherein the biased switch is a momentary push-button switch.

6. A safety devise for alerting a vehicle, compromising:
    a mountable lighting device capable of sending discrete flashing signals, the lighting device compromising:

a housing having a top component and a bottom component configured to define a front aperture when assembled together;
at least one opaque component within the front aperture of the housing;
a plurality of light-emitting diodes within the housing and projected toward the at least one opaque component;
a panel having a plurality of openings to receive the plurality of light-emitting diodes;
at least one printed circuit within the housing and in electrical communication with the plurality of light-emitting diodes;
at least one power source within the housing for providing power to the printed circuit board;
at least one port, within the housing and connected to the printed circuit board, for receiving a Universal Serial Bus connector; and
a biased switch in electrical communication with the lighting device wherein the biased switch is separate from the housing.

7. The safety device of claim 6 wherein the plurality of light-emitting diodes are in a linear array.

8. The safety device of claim 6, further compromising a connector in electrical communication with the at least one port.

9. The safety device of claim 6 wherein the biased switch is a momentary push-button switch.

* * * * *